United States Patent [19]

Jauregui

[11] Patent Number: 4,821,229
[45] Date of Patent: Apr. 11, 1989

[54] DUAL OPERATING SPEED SWITCHOVER ARRANGEMENT FOR CPU

[75] Inventor: Luis H. Jauregui, St. Joseph, Mich.

[73] Assignee: Zenith Electronics Corporation, Glenview, Ill.

[21] Appl. No.: 808,394

[22] Filed: Dec. 12, 1985

[51] Int. Cl.⁴ .............................. G06F 1/00; G04G 7/00
[52] U.S. Cl. ..................................... 364/900; 307/269
[58] Field of Search ... 364/200 MS File, 900 MS File, 364/300; 307/219, 269

[56] References Cited

U.S. PATENT DOCUMENTS

| | | | |
|---|---|---|---|
| 3,623,017 | 11/1971 | Lowell et al. | 364/200 |
| 4,229,699 | 10/1980 | Frissell | 328/63 |
| 4,435,827 | 3/1984 | Kuze | 364/900 X |
| 4,677,433 | 6/1987 | Catlin et al. | 364/131 X |
| 4,727,491 | 2/1988 | Culley | 364/200 |

OTHER PUBLICATIONS

Intel "Microprocessor and Peripheral Handbook", 1983, pp. 3-234-3-241.

Primary Examiner—Gareth D. Shaw
Assistant Examiner—Paul Kulik

[57] ABSTRACT

A user selectable switch arrangement in combination with logic circuitry allows the timing of a central processor unit (CPU) to be switched between two clock frequencies. Operation at a higher frequency permits the CPU to perform an increased number of tasks per unit time and thus increases data throughput, while a lower operating frequency provides enhanced CPU hardware and software interfacing compatibility.

7 Claims, 1 Drawing Sheet

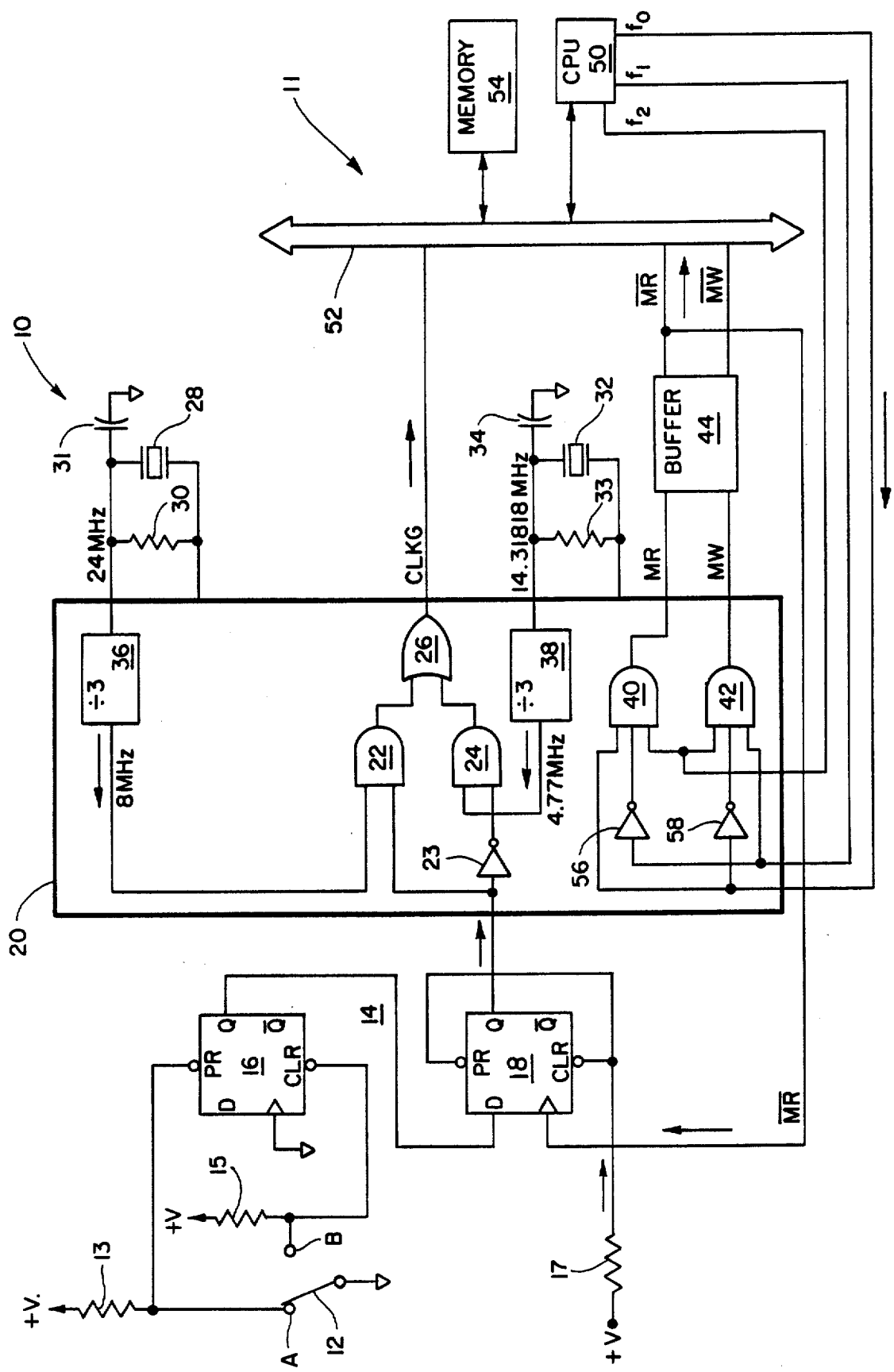

DUAL OPERATING SPEED SWITCHOVER ARRANGEMENT FOR CPU

BACKGROUND OF THE INVENTION

This invention relates generally to central processing units (CPUs) as used in data processing systems and is particularly directed to an arrangement for controlling the operating speed of a CPU.

Many data processing systems include a microcomputer, microprocessor, or central processor unit (CPU), as these terms are used interchangeably in the present application. The control portion of a CPU either contains a clock circuit or has provisions for an external clock input. The clock circuit delivers regular timed signals that serve as the timekeeping mechanism for the CPU. Each event in a sequence occurs in synchronization with the next "clock time" or in response to a signal controlled by the clock and various forms of logic. CPUs typically take several clock periods to accomplish a fetch and several more for execution, so that an instruction cycle may contain on the order of 10 to 20 clock cycles. Most CPUs use crystal controlled clocks. While specific operating frequencies can vary, the stability of these frequencies cannot. In addition, any timing done in software requires the frequency stability of a crystal controlled oscillator.

The rate at which the CPU performs various operations one after another or in the form of a succession of steps controlled by a program is defined by the operating frequency of its clock circuit or crystal oscillator. The higher the operating frequency of the crystal oscillator, the faster the CPU is able to a accomplish various tasks and the greater the throughput in the data processing system. However, the operation of a CPU at a single speed, whether characterized by a high frequency or a low frequency, limits its interfacing flexibility in terms of hardware with which it is compatible and software which controls its operation.

The present invention provides a dual operating speed capability for a CPU which enhances the CPU's interfacing flexibility and permits the CPU to operate at higher speeds for increased data throughput.

OBJECTS OF THE INVENTION

Accordingly, it is an object of the present invention to provide a user selectable capability for allowing a CPU to operate at more than one speed.

It is another object of the present invention to provide increased interfacing flexibility for a CPU in a data processing system.

Yet another object of the present invention is to provide user responsive means for increasing throughput in a data processing system.

A further object of the present invention is to provide enhanced software compatibility in a data processing system.

BRIEF DESCRIPTION OF THE DRAWING

The appended claims set forth those novel features which characterize the invention. However, the invention itself, as well as further objects and advantages thereof, will best be understood by reference to the following detailed description of a preferred embodiment taken in conjunction with the accompanying Figure which illustrates in combined block and schematic diagram form a dual operating speed switchover arrangement for use with a central processor unit in accordance with the present invention.

DETAILED DESCRIPTION OF THE PREFERRED EMBODIMENT

Referring to the Figure, there is shown in combined schematic and block diagram form a dual operating speed switchover arrangement 10 for a central processor unit (CPU) 50 in a data processing system. The dual operating speed switchover arrangement 10 includes a user selectable switch arrangement 14 and a CMOS gate array 20 coupled via a system bus 52 to the CPU 50. A typical data processing system includes many more components than those shown in the Figure and described in the following paragraphs However, for simplicity only those data processing system components relevant to the present invention are discussed herein.

The user selectable switch arrangement 14 includes a grounded manual switch 12 coupled to a +V voltage source via pull-up resistors 13 and 15. The manual switch 12 is further coupled to the preset (PR) and clear (CLR) inputs of a first D flip-flop 16. The Q output of the first flip-flop 16 is provided to the D input of a second D flip-flop 18. The output of the second D flip-flop 18 is provided to the gate array 20 which includes a plurality of logic gates as described below. The +V source is also coupled via a pull-up resistor 17 to the PR and CLR inputs of the second D flip-flop 18. An inverted memory read signal ($\overline{MR}$) is provided to the clock input of the second D flip-flop 18. The user selectable switch arrangement 14 operates in the following manner in controlling a user selected input to the gate array 20.

With the manual switch 12 in position A, a low input is provided to the PR input, and a high input is provided to the CLR input (via pull-up resistor 13) of the first D flip-flop 16. With a low PR input to the first D flip-flop 16, its Q output provided to the D input of the second D flip-flop 18 is high. With the manual switch 12 in position B, the first D flip-flop 16 is cleared and its Q output is low.

A low input to the D input pin of the second D flip-flop 18 results in a low Q output therefrom. Similarly, a high Q output from the first D flip-flop 16 to the D input of the second D flip-flop 18 results in a high Q output therefrom. Whatever is on the D input of the second flip-flop 18 is clocked out of its Q output pin upon receipt of a $\overline{MR}$ clock input, with the Q output of the second flip-flop then provided to the gate array 20. The +V coupled to the PR and CLR inputs of the second flip-flop 18 via pull-up resistor 17 maintains the PR and CLR pins of the second flip-flop high so that its Q output is determined only by the input provided to its D pin. Thus, the first flip-flop 16 provides a switch de-bouncing function following the positioning of the manual switch 12 in either position A or position B. The second flip-flop 18 synchronizes the output of the user selectable switch arrangement 14 provided to the gate array 20 with a $\overline{MR}$ input provided thereto. Thus, if the position of the manual switch 12 is changed during a read or write cycle, an input signal is not provided from the use selectable switch arrangement 14 to the gate array 20 until the end of a memory read cycle in response to the occurrence of the rising edge of the $\overline{MR}$ input provided thereto. This ensures that the output of the user selectable switch arrangement 14 provided to the gate array 20 is synchronous with a memory read cycle. Synchronization of the input to the gate array 20 with a memory read cycle, in turn, ensures that a change in the operating frequency of the data processing system 11 occurs at the end of a memory read cycle and avoids a change in the operating frequency of the system during a read or write cycle.

The gate array 20 is responsive to the $\overline{MR}$ synchronized output of the user selectable switch arrangement 14 and includes a plurality of logic gates therein. The output of the user selectable switch arrangement 14 is provided to one input of a first AND gate 22 and, via an inverter 23, to one input of a second AND gate 24.

The gate array 20 further includes first and second crystal oscillators 28 and 32. The first crystal oscillator 28 has associated therewith an RC network comprised of resistor 30 and grounded capacitor 31. Similarly, the second crystal oscillator 32 has associated therewith an RC network comprised of resistor 33 and grounded capacitor 34. In a preferred embodiment, the gate array 20 is a U47 CMOS gate array wherein the frequency of the first crystal oscillator 28 is 24 MHz and the frequency of the second crystal oscillator 32 is 14.31818 MHz. The gate array 20 further includes first and second divide-by-three circuits 36 and 38 respectively coupled to the first and second crystal oscillators 28, 32. Each of the first and second divide-by-three circuits 36 and 38 divides the operating frequency of the crystal oscillator to which it is coupled by three in respectively generating 8 and 4.77 MHz outputs. The 8 MHz output of the first divide-by-three circuit 36 is provided to one input of the first AND gate 22, while the 4.77 MHz output of the second divide-by-three circuit 38 is provided to one input of the second AND gate 24. A high output from the second flip-flop 18 with the manual switch 12 in position A provided to one input of the first AND gate 22 gates the 8 MHz input through the first AND gate and to one input of an OR gate 26. The inverter 23 inverts the high Q output from the second flip-flop 18 and provides a low input to the second AND gate 24. Thus, with the manual switch 12 in position A, an 8 MHz signal is provided via AND gate 22 to one input of OR gate 26, while the 4.77 MHz input to the second AND gate 24 is not gated through to OR gate 26. A clock signal designated CLKG is then provided from OR gate 26 to the system bus 52 and defines the operating frequency or speed of the data processing system 11.

With the manual switch 12 in position B, and a low Q output provided from the first flip-flop 16 to the D input of the second flip-flop 18, a low Q output is provided from the user selectable switch arrangement 14 to the gate array 20. With a low input provided to one input pin of the first AND gate 22, the 8 MHz clock signal is not gated through to the OR gate 26. The low Q output from the user selectable switch arrangement 14 is inverted by inverter 23 resulting in a high input being provided to one input of the second AND gate 24. Receipt of the 4.77 MHz clock signal and a high output from the inverter 23 by the second AND gate 24 results in the 4.77 MHz clock signal being gated through to the OR gate 26. OR gate 26 thus gates the 4.77 MHz clock signal through as the CLKG signal to the system bus 52. Thus, with the manual switch 12 in position A, an 8 MHz clock signal is gated through the first AND gate 22 and OR gate 26 as the CLKG signal to the system bus 52. Similarly, with the manual switch 12 in position B, the 4.77 MHz signal is gated through the second AND gate 24 and the OR gate 26 as the CLKG signal to the system bus 52.

The system bus 52 is coupled to various components of the data processing system 11 including the CPU 50. Various data and control signals are provided via the system bus 52 to the CPU 50 including system timing signals. Thus, the CLKG signal output from the gate array 20 is provided via the system bus 52 to the CPU 50 for establishing its operating frequency. The CPU 50 provides output signals for controlling the operation of the data processing system 11. Included in these output signals are a plurality of status signals, three of which are designated as $f_0$, $f_1$ and $f_2$ in the Figure. The status signals $f_0$, $f_1$ and $f_2$ are not uniquely generated for the purposes of the present invention, but rather are conventional output signals from the CPU 50 by means of which the CPU exercises control over the data processing system 11.

In the present invention, the $f_0$ and $f_1$ status signals are respectively provided by the CPU 50 to one input of each of AND gates 40 and 42. These status signals are complemented by inverters 56 and 58, and are provided to a second input of AND gates 40 and 42. To the third input of each of AND gates 40 and 42 is provided the $f_2$ output from CPU 50. Either the $f_0$ or $f_1$ output from the CPU 50 will be high at a given time resulting in the gating through of either the memory read (MR) or memory write (MW) signal from either AND gate 40 or AND gate 42 to a buffer circuit 44. The buffer circuit 44 inverts the MR or MW outputs from the gate array 20 and provides either an $\overline{MR}$ or an $\overline{MW}$ output having an appropriate signal level to the system bus 52 whereupon data is either read from or written into the system memory 54. The $\overline{MR}$ output from the buffer circuit 44 is also provided to the CLOCK input of the second flip-flop 18 for synchronizing its Q output with a memory read cycle in the data processing system. By thus synchronizing the Q output of the second flip-flop 18 provided to the gate array 20 with a memory read cycle, a change in the operating speed of the data processing system 11 in response to user selection of the manual switch 12 occurs in the next succeeding memory read cycle so as to permit the completion of a current memory read or write operation before the operating frequency changes.

There has thus been shown a dual operating speed switchover arrangement for a data processing system wherein the operating speed or frequency of the system may be selected by a user responsive manual switch for generating a memory read cycle synchronous control signal representing either a first or a second operating speed. This control signal is provided to a logic circuit for generating a selected clock signal which is provided to a system bus for controlling the operating speed of the system's CPU.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a data processing system including a system bus and a CPU coupled thereto wherein the CPU is responsive to a clock signal provided from the system bus for establishing the operating speed of the CPU and the data processing system, an arrangement for selecting the operating speed of the data processing system comprising:

user responsive switch means for generating a first control signal when said switch means is in a first position and a second control signal when said switch means is in a second position;

logic means including first and second clock means coupled to the system bus and to said user responsive switch means and responsive to said first and second control signals for respectively providing a first clock signal from said first clock means to the CPU via the system bus upon receipt of said first control signal from said user responsive switch means whereupon the data processing system operates at a first speed or for providing a second clock signal from said second clock means to the CPU via the system bus upon receipt of said second control signal from said user responsive switch means whereupon the data processing system operates at a second speed, wherein said logic means is further coupled to the CPU and is responsive to status signals output therefrom for generating a third control signal;

feedback means coupling said logic means to said switch means for providing said third control signal thereto for synchronizing said first and second control signals with said third control signal; and a system memory coupled to the system bus, wherein said third control signal is either a memory read signal or a memory write signal for synchronizing said first and second control signals and a change in data processing system operating speed associated therewith with a change in operation of said memory such that a change in data processing system operating speed occurs only after the completion of a memory read or write operation.

2. The arrangement of claim 1 wherein said user responsive switch means includes a manual switch and a plurality of bi-stable circuit elements each having two stable states.

3. The arrangement of claim 2 wherein each of said bi-stable circuit elements comprises a flip-flop.

4. The arrangement of claim 1 wherein said logic means further includes first and second AND gates and an inverter, wherein said first AND gate is coupled to said switch means and to said first clock means and said second AND gate is coupled to said second clock means and is further coupled to said switch means by means of said inverter.

5. The arrangement of claim 4 wherein said logic means further includes third and fourth AND gates coupled to the CPU and responsive to said status signals output therefrom for generating said third control signal.

6. The arrangement of claim 1 wherein each of the first and second clock means includes a respective crystal oscillator.

7. The arrangement of claim 1 further comprising a buffer circuit coupling said logic means to the system bus and to said feedback means.

* * * * *